A. C. HANSCH.
AUTOMATIC OPERATING CAMERA.
APPLICATION FILED MAR. 30, 1914.

1,235,685.

Patented Aug. 7, 1917.
7 SHEETS—SHEET 1.

A. C. HANSCH.
AUTOMATIC OPERATING CAMERA.
APPLICATION FILED MAR. 30, 1914.

1,235,685.

Patented Aug. 7, 1917.
7 SHEETS—SHEET 3.

WITNESSES:
John Jessich
[signature]

INVENTOR
August C. Hansch
ATTORNEY
[signature]

A. C. HANSCH.
AUTOMATIC OPERATING CAMERA.
APPLICATION FILED MAR. 30, 1914.

1,235,685.

Patented Aug. 7, 1917.
7 SHEETS—SHEET 7.

UNITED STATES PATENT OFFICE.

AUGUST C. HANSCH, OF JERSEY CITY, NEW JERSEY.

AUTOMATIC-OPERATING CAMERA.

1,235,685.
Specification of Letters Patent. Patented Aug. 7, 1917.
Application filed March 30, 1914. Serial No. 828,110.

*To all whom it may concern:*

Be it known that I, AUGUST C. HANSCH, a citizen of the United States, and a resident of Jersey City, in the county of Hudson and State of New Jersey, have invented certain new and useful Improvements in an Automatic-Operating Camera, of which the following is a specification.

This invention relates to an automatic operating camera, which is automatically focused with different positions from a copy. Simultaneously with the automatic focusing of the camera, means are provided for automatically regulating the openings of the diaphragm of the lens of the camera. Adjustable automatic means are provided to control the intervals of time of exposure, and automatically controlled means to regulate a source of illumination are provided.

The camera is represented with the supporting frame comprising the side sills 20, cross girders 21 with the legs 22. Springs 23 are mounted on the sills 20 and carry the runway frame having the side sills 26 and 27 and cross girders 28. Tracks 31 are supported on the sills 26, 27. A switch 33 extends up from the sill 27. A rack 30 and a focus adjusting cam holder having the racks 32 with lugs 35 are carried on the sill 26. An angle iron 34 carried on the side sill 27 constitutes an outboard support for said switch. A cam 36 with serrated sides 37 can be located in various positions in the racks 32.

A camera frame is located above the said running frame and comprises the side sills 38 and 39 and cross girders 40, 41. Wheels 42 support the side sills 38, 39 and engage the tracks 31. Side tracks 43 extend from the inner faces of the side sills 38, 39.

In the cross girders 40, 41 are fitted bushings 45, 46 for the bellows adjusting screw 48. Journals 49 formed at the ends of the screw 48 are supported in the bushings 45, 46, and collars 50 are fastened on the screw 48, which prevent its longitudinal displacement. Bushings 55 are supported in the girders 40, 41 for the regulating shaft 56 that has extending therefrom the regulating handle 57.

Bellows frames 60, 61, 62 are located above the said camera frame. Brass angles 63 extend from the lower faces of the frames 60, 61 and have journaled therein the rollers 64 that are supported on the side tracks 43. A stationary nut 65 extends from the lower face of the frame 60 and engages the screw 48. Bellows 66 connect the frames 60, 61 and bellows 67 connect the frame 61, 62. The bellows frame 60 and 61 are movable and the frame 62 is stationary on the camera frame. In the bellows frame 60 are supported guides 70 for the slides 71 which support a screen holder 72 for the screen 73. A pair of upper bell cranks with the arms 74 and 75 are pivoted to the opposite sides of the bellows frames 60 and a pair of similar lower bell cranks with the arms 76, 77 are also pivoted to the opposite sides of said frame 60. A link 78 connects the arms 75 and 77. An adjusting handle 85 extends from a pivot 86 journaled in one of the sides of the frame 60, and has extending therefrom a pointer 87 for the scale 88. An arm 89 extends from the pivot 86 and is pinned to the link 78. By means of the handle 85 and its appurtenances the screen holder 72 with the screen 73 can be adjusted in proper position.

A plate holder 92 is locked with the frame 60 in the usual way.

On the side sill 38 of the camera frame is located the supporting plate 100 and one end of the bracket with the feet 101 and foot 102. The feet 101 are joined by the upper members 103 having formed therewith the hub 104, and the curved upper member 105 joins the bearing 104 with the foot 102. Journal bearings 106 and 107 are formed in the member 105. The foot 102 is secured to one of the outer faces of the bellows frame 62. A stationary shaft 110 is secured in the plate 100 and in the hub 104. A spur gear 111 is journaled on the shaft 110 and meshes with the rack 30, to rotate during any movement of the said camera frame. A bevel gear clutch member 112 extends from the spur gear 111. A spur gear 113 with the sleeve 114 is journaled on the shaft 110 and the sleeve has connected thereto the spline 115. A bevel gear clutch member 116 is supported on the sleeve 114 and is engaged by the spline 115. A hub 117 with the groove 118 is formed with the clutch member 116. A spring 119 encircles the sleeve 114 and bears between the spur gear 113 and the hub 117. An auxiliary bracket 120 extends from the members 103 and has formed therewith the lugs 121 which have pivoted thereon a forked lever with the members 122 and the member 123. Pins 124 extend from the members 122 and engage the groove 118.

A journal plate 125 is secured to the bellows frame 62 axially below the journal bearing 106 and a shaft 126 is journaled in the plate 125 and bearing 106. A spur gear 127 is fastened to the shaft 126 and meshes with the spur gear 113. A second spur gear 128 is fastened to the shaft 126. A journal plate 130 is fastened to the bellows frame 62 and is axially in line with the journal bearing 107. A shaft 131 is journaled in the journal plate 130 and bearing 107. A spur gear 132 is fastened to the shaft 131 and meshes with the spur gear 128, by means of which rotation is transmitted from the shaft 126 to 131.

A shelf 135 is formed with and extends from the bellows frame 62. A journal bracket with the feet 136, 137 and connecting member 138 is fastened to the shelf 135. Journal bearings 141, 142, 143, 144 and the hub 145 are formed with the connecting member 138. A bracket with feet 148, 149 and the connecting member 150 is fastened to the front face of the bellows frame 62. Journal bearings 151, 152, 153 and 154 are formed with the connecting member 150. A shaft 156 is journaled in the journal bearings 141 and 151 and has fastened to one end thereof the spur gear 157 which meshes with the spur gear 132. A spiral toothed cone 160 is fastened to the shaft 156. The diameter of the pitch circle of the cones 160 and 176 at the large ends equals five and thirteen-sixteenths inches. The diameter of the pitch circles of the cones 160 and 176 at the small ends thereof equals one and nine-sixteenths inches. The length of each cone measured on the longitudinal axis equals five and one-half inches. The number of turns for each spiral on the cones 160 and 176 is twelve and four-tenths. A shaft 161 is journaled in the journal bearings 142, 152 and has fastened thereto the spline 162 and the spur gear 163. A bevel gear 164 slidably carried on the shaft 161, engages the spline 162 and meshes with the spiral toothed cone 160. A shaft 165 is journaled in the bearings 143, 153 and has fastened thereto the spline 166 and the spur gear 167. A shaft 178 extends from the hub 145 and on which is journaled the pinion 169 that meshes with the gears 163 and 167. A bevel gear 168 is slidably carried on the shaft 165 and engages the spline 166. The bevel gears 164 and 168 are made of diameters so that one can pass and clear the other. A shaft 175 is journaled in the journal bearings 144, 154 and has fastened thereto the spiral toothed cone 176 which is oppositely positioned in relation to the spiral toothed cone 160. The cones 160 and 176 are made of any convenient size and in the present instance are of equal diameters and pitch. To vary the relative proportion of the spiral cones 160 and 176 the positions of the bevel gears 164 and 168 are initially placed in such position relative to each other that the required proportion between the spiral cones is obtained. The bevel gear 168 meshes with the spiral toothed cone 176. A spiral gear 177 is fastened to the shaft 175. Journal brackets 180, 181 are fastened to and extend from the shelf 135 and a shaft 182 is journaled in said brackets. A spiral gear 183 is fastened to the shaft 182 and meshes with the spiral gear 177. A second spiral gear 184 is fastened to the shaft 182.

Journal brackets 186, 187 are fastened to and extend from the front face of the bellows frame 62. A shaft 188 is journaled in the brackets 186, 187 and has fastened thereto the spiral gears 189 and 190. The spiral gear 189 meshes with the spiral gear 184. A spiral gear 191 on the screw 48 meshes with the spiral gear 190 and thereby rotation is transmitted to the said screw 48. With the rotations of the screw 48 the stationary nut 65, the bellows frame 60 and 61 are given a movement of translation which extends or contracts the bellows. A bevel gear 196 is fastened to the screw 48.

Referring to Figs. 1, 3 and 19 to 24, an automatic operating diaphragm and lens casing are represented with their appurtenances.

A barrel 200 is in threaded engagement with the sleeve 201 on the bellows frame 62. A lens support 202 carrying the lens 203 is in threaded engagement with the barrel 200. A stationary disk 204 having the opening 205 is in threaded engagement with the barrel 200. The said disk 204 is threaded on its circumferential surface. An annular disk 206 with the threaded flange 207 is in threaded engagement with the disk 204. A movable disk 208 with the opening 209 and opening 210 having the teeth 211 is located within said flange 207. Blades 215 with the curved ends 216 are located between the disks 204 and 208. Pins 217 connect the blades 215 with the disk 208 and pins 218 connect said blades with the disk 204. A stationary disk 220 threaded on its outer periphery 221 has formed therewith the central internally threaded flange 222. It is in threaded engagement with the flange 207 of the disk 206. A pin 223 extends from the disk 220. A pivot 224 extends through the disk 220 and has fastened thereto on its opposite sides the pinion 225 and the gear 226.

A lens barrel 230 is in threaded engagement with the flange 222 and carries in threaded engagement the lens support 231 for the lens 232. A toothed movable disk 235 is supported on the stationary disk 220. The disk 235 has formed therewith an annular opening 236 that engages the pin 223. Teeth 237 are formed on the outer surface of a hub 238 of the disk 235, and teeth 239 are formed on the outer circumferential surface of said disk 235. The teeth 237 mesh with the gear 226.

A stop 245 extends from the toothed movable disk 235.

A sleeve 246 with the flange 247 encircles the lens barrel 230, and has formed therewith the threaded end 248. A spur gear 249 encircles the sleeve 246, and has extending therefrom a lug 250 which carries a barrel 251 for the plunger 252. A flange 253 extends from the plunger 252 and a spring 254 encircles the plunger and bears between said flange 253 and the cap 255 of the barrel 251. A shouldered portion 256 is formed with the spur gear 249. An annular ratchet 260 bears against the shouldered portion 256 of the gear 249, and a ring plate 261 is held in place on the gear 249 by means of the screws 262, and thereby the said annular ratchet 260 is movably maintained in proper positions. A cam 265 with the flat faces 266, 267 and the stop projections 268, 269 extends from the annular ratchet 260. The cam 265 is positioned to engage the plunger 252 of the gear 249. A separating ring 271 surrounds the sleeve 246 and one of its end faces bears against the gear 249. A gear 272 similar to the gear 249 encircles the sleeve 246 and is shouldered at 273. A lug 274 which carries a barrel 275 similar to 251 with the spring actuated plunger 276 similar to 255 extends from the gear 272. An annular ratchet 280 similar to 260 bears against the shouldered portion 273 of the gear 272. A ring plate 281 similar to 261 is held in place on the gear 272, by means of the screws 282, and thereby the said ratchet 280 is movably maintained in proper position. A cam 285 similar to 265 with the flat faces 286, 287 and the stop projections 288, 289 extends from the annular ratchet 280. The cam 285 is positioned to engage the plunger 276 of the gear 272. A separating ring 291 surrounds the sleeve 246 and one of its end faces bears against the gear 272. A gear 292 similar to 249 encircles the sleeve 249 and bears against the outer end face of the separating ring 291. It is shouldered at 293 and has extending therefrom a lug 294 similar to 250. The lug 294 carries a barrel 295 similar to 251 with a spring actuated plunger 296 similar to 252.

An annular ratchet 300 bears against the shouldered portion 293 of the gear 292. A ring plate 301 encircles the sleeve 246 and is located adjacent to the outer faces of the gear 292. A ring 302 is in threaded engagement with the outer end of the sleeve 246 and bears against the ring plate 301. A spring 302 has one end fastened to the toothed movable disk 235 and the other end thereof is fastened to the front face of the bellows frame 62. A cam 303 having the flat faces 304, 305 and the stops 306 and 307 extends from the annular ratchet 280.

A gear cage with the bottom plate 308, top plate 309 and connecting bolts 310 is fastened to the front face of the bellows frame 62 by means of the screws 311. A central plate 312 is supported on the connecting bolts 310. A shaft 313 is journaled in the central plate 312 and in the top plate 309. It has fastened thereto the gears 314, 315 and 316. The gear 314 meshes with the gear 249, the gear 315 meshes with the gear 372 and the gear 316 meshes with the gear 392. A worm wheel 320 is fastened to the shaft 313 and is located above the top plate 309. A shaft 321 is journaled in the bottom plate 308 and top plate 309 of the said cage. Pawls 322, 323 and 324 are fastened to the shaft 321 and are respectively in engagement with the annular ratchets 260, 280 and 300. A spiral gear 328 is fastened to the shaft 321 to control said pawls.

A bearing plate 330 is fastened to cross girders 40 and a journal bracket 331 extends up from the top plate 306. A shaft 332 is journaled in the bearing plate 330 and in the journal bracket 331. A bevel gear 333 fastened to the shaft 332 meshes with the bevel gear 196 on the adjusting screw 48. A worm 334 fastened to the shaft 332 meshes with the worm wheel 320.

To the front face of the bellows frame 62 are fastened the journal brackets 336 and 337 for the sleeve 338. A dial 339, bevel gear 340 and the disk 341 with the annular groove 342 having the opening 343 and the bevel gear clutch member 344 are fastened to the sleeve 338. A shaft 348 is supported in the sleeve 338 and to one end of which is fastened the sector 349. A bevel gear clutch member 350 is fastened to the shaft 348 which engages with the bevel gear clutch member 344. A spline 351 on the shaft 348 carries the collar 352 of the pointer 353. A knurled head 354 is fastened to the outer end of the shaft 348 and a spring 355 encircling the shaft 348 bears between the head 354 and the collar 352. The spring 355 maintains the clutch members 344 and 350 in engagement. An auxiliary journal bracket 356 extends up from the bracket 336 and supports the plunger 357 having extending therefrom near one end thereof the disk flange 358. A loose washer 359 on the plunger 357 is located adjacent to the journal bracket 356. A spring 360 encircles the plunger 357 and bears between the washer 359 and the disk flange 358. The plunger 357 is positioned so as to engage the annular groove 342 and locks with the opening 343.

A journal bracket 365 with the bearing 366 and a double journal bracket 367 with the bearings 368 and 369 are fastened to and extend up from the front face of the bellows frame 62. A shaft 373 is journaled in the bearings 366 and 368. A spline 374 extends from the shaft 373. A bevel gear 375 with the hub 376 having the groove 377 is axially movable on the shaft 373 and engages with the spline 374. The bevel gear 375 is positioned to engage with the bevel gear 340. A flange 380 extends from the shaft 373 and a spring 381 has one end fastened to the hub 376 and its other end is fastened to the flange 380.

A spur gear 382 is fastened to the shaft 373.

To the front face of the bellows frame 62 are fastened journal brackets 386 and 387 for the sleeve 388. A dial 389, bevel gear 390 and disk 391 with the annular groove 392 having the opening 393 and the bevel gear clutch member 394 are fastened to the sleeve 388. A shaft 398 is supported in the sleeve 388 and to one of which is fastened the sector 399. A bevel gear clutch member 400 is fastened to the shaft 398 which engages with the bevel gear clutch member 394. A spline 401 on the shaft 398 carries the collar 402 of the pointer 403. A knurled head 404 is fastened to the outer end of the shaft 398 and a spring 405 encircling the shaft 398 bears between the head 404 and the collar 402. The spring 405 maintains the clutch members 394 and 400 in engagement. An auxiliary journal bracket 406 extends from the bracket 386 and supports the plunger 407 having extending therefrom near one end thereof the disk flange 408. A loose washer 409 on the plunger 407 is located adjacent to the journal bracket 406. A spring 410 encircles the plunger 407 and bears between the washer 409 and the disk flange 408. The plunger 407 is positioned to engage the annular groove 392 and locks with the opening 393.

A double journal bracket 417 with the bearings 418 and 419 is fastened to and extend up from the front face of the bellows frame 62. A shaft 423 is journaled in the bearings 369 and 418. A spline 424 extends from the shaft 423. A bevel gear 425 with the hub 426 having the annular groove 427 is axially movable on the shaft 423 and engages with the spline 424. The bevel gear 425 is positioned to engage with the bevel gear 390. A flange 430 extends from the shaft 423 and a spring 431 has one end fastened to the hub 426 and its other end is fastened to the flange 430.

A spur gear 432 is fastened to the shaft 423.

To the front face of the bellows frame 62 are fastened journal brackets 436 and 437 for the sleeve 438. A dial 439, bevel gear 440 and disk 441 with the annular groove 442 having the opening 443 and the bevel gear clutch member 444 are fastened to the sleeve 438. A shaft 448 is supported in the sleeve 438 and to one end of which is fastened the sector 449. A bevel gear clutch member 450 is fastened to the shaft 448 which engages with the bevel gear clutch member 444. A spline 451 on the shaft 448 carries the collar 452 of the pointer 453. A knurled head 454 is fastened to the outer end of the shaft 448 and a spring 455 encircling the shaft 448 bears between the head 454 and the collar 452. The spring 455 maintains the clutch members 444 and 450 in engagement. An auxiliary journal bracket 456 extends from the bracket 436 and supports the plunger 457 having extending therefrom near one end thereof the disk flange 458. A loose washer 459 on the plunger 457 is located adjacent to the journal bracket 456. A spring 460 encircles the plunger 457 and bears between the washer 459 and the disk flange 458. The plunger 457 is positioned to engage the annular groove 442 and locks with the opening 443. A journal bracket 471 with the bearing 472 is fastened to and extends up from the front face of the bellows frame 62. A shaft 473 is journaled in the bearings 419 and 472. A spline 474 extends from the shaft 473.

A bevel gear 475 with the hub 476 having the annular groove 477 is axially movable on the shaft 473 and engages with the spline 474. The bevel gear 475 is positioned to engage with the bevel gear 440. A flange 480 extends from the shaft 473 and a spring 481 has one end fastened to the hub 476 and its other end is fastened to the flange 480.

Spur gears 482, 483, 484 and 485 are fastened to the shaft 473. Journal brackets 490, 491 and 492 respectively with the bearings 493, 494 and 495 are fastened to the front face of the bellows frame 62. A shaft 496 is journaled in the bearings 493, 494 and 495. Spur gears 497, 498, and 499 on the shaft 496 respectively mesh with the spur gears 482, 432 and 382.

Bearings 505 and 506 are respectively formed in the brackets 471 and 492 for the shaft 517. A journal bracket 518 adjacent to the journal bracket 471 also supports the shaft 517. Spur gears 520, 521 and 522 are fastened to the shaft 517. An auxiliary shaft 523 is journaled in bearings 528 and 529 respectively formed in the journal brackets 471 and 492. An arm 530 adjustably fastened to the shaft 523 has journaled thereto a gear 531 which can be located to mesh with either one of the following pairs of gears 483, 522—484, 521— and 485, 520 to transmit various speeds from the shaft 517 to the shaft 473. A spiral gear 532 is fastened to the shaft 517.

A dove-tailed guide bar 535 is fastened to the front face of the bellows frame 62 by means of the lugs 536 extending therefrom. A rack 537 with the groups of teeth 540, 541, 542 is slidably supported in the guide bar 535 and positioned so that the said groups 540, 541, and 542 can respectively mesh with the sectors 349, 399 and 449.

A journal bracket 560 is fastened to the front face of the bellows frame 62 and has journaled therein the shaft 561. A spur gear 562 fastened to the shaft 561 meshes with the group 542 of the rack 537. A spiral gear 563 fastened to the shaft 561 meshes with the spiral gear 328.

A bracket 590 is fastened to the front face of the bellows frame 62 and carries the motor 591. A worm 592 is fastened to the armature shaft of said motor. An auxiliary bracket 593 is supported on the bracket 590 and has journaled thereto the shaft 594. A worm 595 is formed with the shaft 594 and said shaft has fastened thereto the worm wheel 596 which meshes with the worm 592. A second auxiliary bracket 597 extends from the bracket 590. A journal bracket 600 extends up from the front face of the bellows frame 62. A shaft 601 is journaled in the bracket 597 and 600. A worm wheel 602 fastened to the shaft 601 meshes with the worm 595. A spiral gear 603 fastened to the shaft 601 meshes with the spiral gear 532.

The shaft 56 has fastened thereto the spur gear 605. A shaft 610 is journaled in a bearing 611 formed with the bracket 590 and has fastened thereto a spur gear 612 which meshes with the spur gear 605. A cam 613 is fastened to the shaft 610 and can engage the end of the rack 537. A bracket 614 extends from the front face of the bellows frame 62 and has journaled therein the shaft 615 which carries the spur gear 616 that meshes with the gear 612. A bevel gear 617 and cam 618 are fastened to the shaft 615. Journal brackets 622, 623 and 624 are fastened to the front face of the bellows frame 62 and support the shaft 625 that has extending therefrom the fingers 626, 627 and 628. The said fingers respectively engage the disk flanges 358, 408 and 458. A bevel gear 629 fastened to the shaft 625 meshes with the bevel gear 617.

Auxiliary bearings 635, 636, 637 and 638 respectively, extend from the journal brackets 365, 367, 417 and 471. A shaft 640 with the fingers 641, 642, 643 is slidably supported in the auxiliary bearings 635, 636, 637 and 638. The fingers 641, 642 and 643 respectively engage the annular grooves 377, 427 and 477 of the hubs 376, 426 and 476, respectively.

A pivot bracket 645 is fastened to the journal bracket 471. Levers 646 and 647 are pivoted at their central portions to the bracket 645 and are connected by the pivot 648.

One end of the lever 646 is pinned to the lower end of the shaft 640 and one end of the lever 647 is engaged by the cam 618. A bracket 650 with the bearings 651 and 652 extends from the front face of the bellows frame 62. A pivot 653 is journaled in the bearing 652 and has fastened thereto the spur gear 654, which meshes with the teeth 239 of the disk 255. A pinion 655 is also fastened to the pivot 653. A pivot 656 is journaled in the bearing 651 and has fastened thereto the spur gear 657 which meshes with the pinion 655.

A link is represented with the members 670 and 671. A longitudinal slot 672 is formed in the member 670 and a pin 673 extending from the member 671 engages the slot 672 for a lost motion connection. The upper end of the member 670 is pinned to the spur gear 657 and the lower end of the member 671 is pinned to the spur gear 612.

Figures 3, 4, 5:
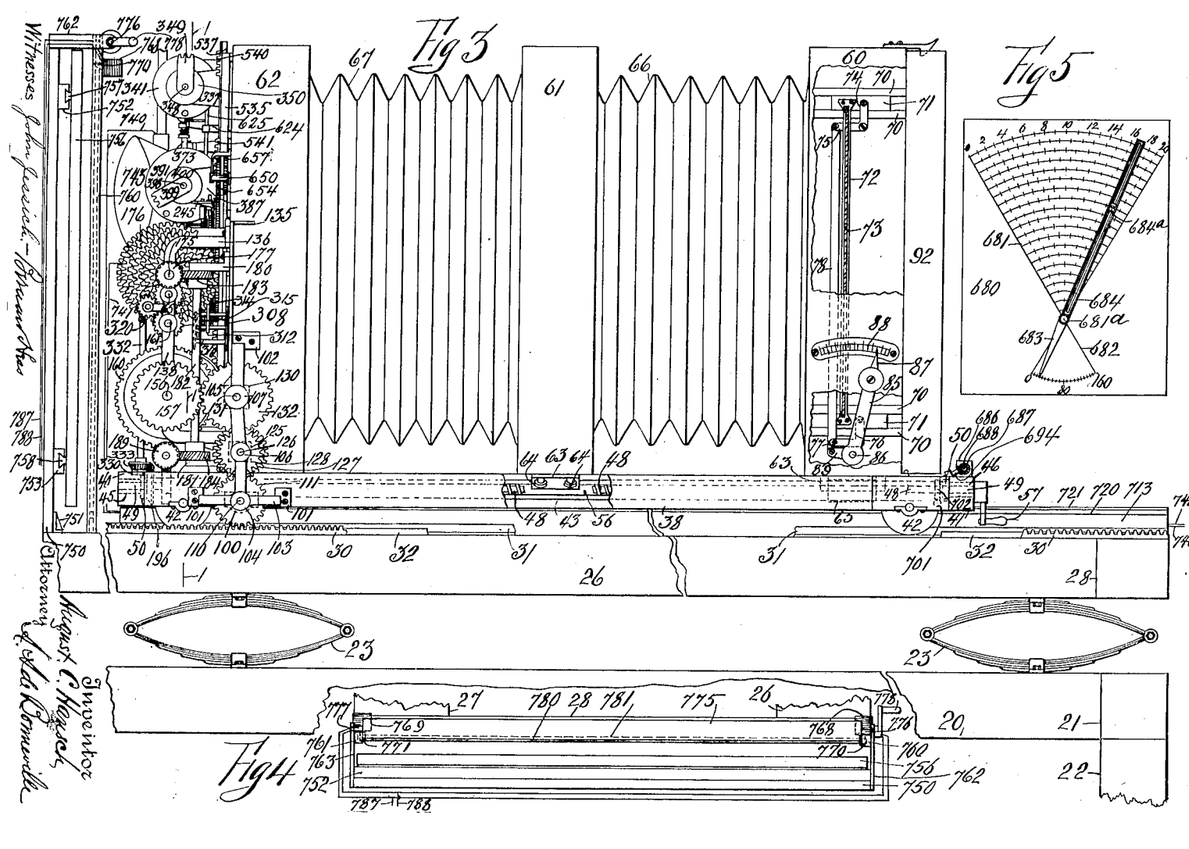
Fig. 3 shows a right hand side view of Fig. 1 on a somewhat reduced scale.
Fig. 4 represents a top plan view of some of the details of Fig. 3.
Fig. 5 is a section of Fig. 6 on line 5, 5.
Figures 25, 26, 27, 28, 29:
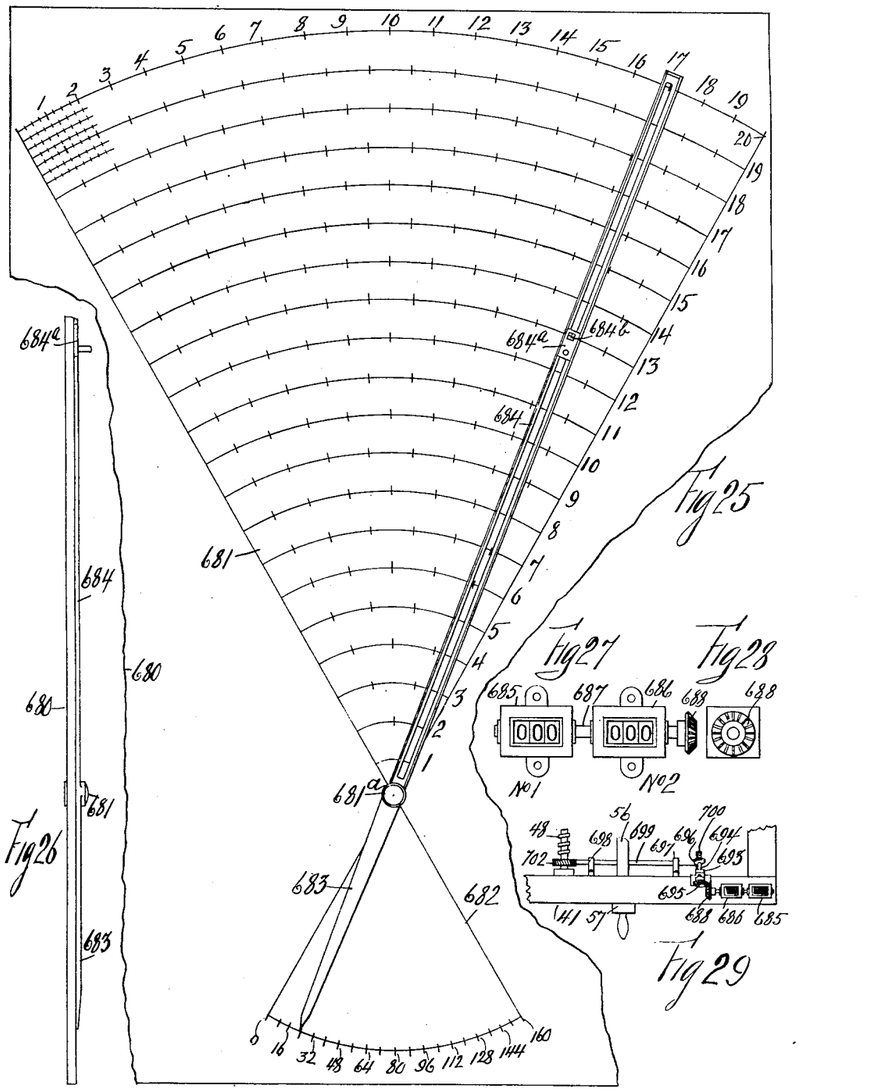
Fig. 25 represents an enlarged fragmentary plan view of the chart shown in Fig. 5.
Fig. 26 shows a partial left hand side view of Fig. 25.
Fig. 27 represents a top plan view of a numbering machine.
Fig. 28 is a right hand side view of Fig. 27.
Fig. 29 shows a partial top plan view of a portion of Fig. 3.

Referring to Figs. 5, 25, 26, an adjusting chart is represented to comprise a base 680, on which is represented a scale comprising the sectors 681 and 682. A pointer 683 with the guide leg 684 is pivoted to the base 680 by means of the pin 681ª. A rider 684ª with cross lines 684ᵇ is movably supported on the leg 684. In the present instance twenty arcs designated by the numerals 1 to 20 are drawn upon the base 680. The arc 20 is divided into 20 main units and each of these units is again divided into smaller units. Arc 19 is divided into 19 main units. Arc 18 is divided into 18 main units and the remaining arcs are divided into a number of units corresponding to the numerals at the end of the arcs. Lines are drawn from the axial center of the pivot 681 to intersect each of the divisions of the different arcs and the continuations of the latter lines are made to intersect the arcs, the main intersections of which are indicated by the numerals in the upper arc of Fig. 25. The divisions on the arc of the sector 682 are determined as follows: the holder carrying the sensitive material is located at various equal distances from the stationary frame 62 and reductions or enlargements are made as the case may be. The proportional reduction or enlargement is then directly measured from the photograph. The numbers appearing on the counters 685 and 686 being noted. Next the pointer 684 and the rider 684ª are located on the points corresponding to the enlargement or reduction. These points are on the sector 681. The enlargement or reduction being determined by actual measurement of the "test" photographs. The numerals as noted on the dials 685 and 686 are then inserted at the proper points on the arc of the sector 682. To determine the intervening numbers on said arc the points just determined are located on cross section paper and the curve determined. The locations of the points with their numerals may then be readily determined either by measurement or by computation, using the well known equations of analytical geometry.

A numbering machine is secured to the cross girder 41 of the camera frame. It comprises the two housings 685, 686 that are connected by the spindle 687. A bevel gear 688 is fastened to the spindle 687. The counter with the housing 685 is used for enlarging and the counter with the housing 686 is used for reduction as will be explained.

A bracket 693 is fastened to the cross girder 41 and has journaled therein the shaft 694 on one end of which is fastened a bevel gear 695 which meshes with the bevel gear 688.

A spiral gear 696 is also fastened to the shaft 694. Journal brackets 697 and 698 are supported upon the cross girder 41 and have journaled therein the shaft 699. Spiral gears 700 and 701 are fastened to the opposite ends of the shaft 699. The spiral gear 700 meshes with the spiral gear 696. A spiral gear 702 is fastened to the screw 48 and meshes with the spiral gear 701. The numbering machine is brought in action by means of the train of gearing between the screw 48 and the shaft 687.

The switch 33 already referred to comprises the two pair of long contact bars 710 and 711 which extend from the fiber supports 712 and 713 respectively. The supports 712, 713 have located below them the sheet of asbestos 714 which latter is carried on the wooden plank 715. Sheets 720 of asbestos cover the supports 712, 713 and sheets of fiber 721 cover the sheets of asbestos 720.

Brackets 725 and 726 extend from the bellows frame 62 and have journaled therein the tubular shaft 727, on the upper end of which latter is secured the disk 730. A pin 731 extends from the disk 730. A connecting rod 732 has one end connected to pin 731 and the other end of the connecting rod is pinned to a leg 733 that extends from the plunger 457. To the lower end of the tubular shaft 727 is fastened a flange 734 of insulating material and from the latter extends the curved contact pieces 735. Wires 736, 737 extend from the electric motor 591, enter the tubular shaft 727 and are connected to the contact piece 735.

Wires 740, 741 extend from one of each of the pairs of contact bars 710 and 711 and connect with the electric lamp 743 which is used to illuminate the copyboard to be described. Only one lamp is shown but a number may be used. Mainline wires 745, 746 extend from a source of electric power and connect with one of each of the pairs of contact bars 710, 711 respectively.

On one of the cross girders 28 of the runway frame is mounted the copyboard support 750, held in place by the brackets as indicated at 751. Dovetailed guides 752, 753 are secured to the support 750. A copyboard 756 has extending therefrom the crossheads 757, 758 which respectively are supported in the guides 752, 753. To the copy board 756 is secured the copy to be photographed. A pair of grooved guide bars 760, 761 are located parallel to the copyboard 756 and have their lower ends fastened to the side sills 26 and 27 of the runway frame. The top ends of the guide bars 760, 761 are connected to the support 750 by means of the cleats 762, 763. A pair of solenoids 768, 769 with cores 770, 771 are respectively supported on the guide bars 760, 761.

A curtain roller 775 has extending therefrom journal pins 776, 777 which are supported in the cleats 762, 763. An operating handle 778 extends from the pin 776. A curtain 780 is supported and rolled upon the roller 775. A bar 781 is supported at the lower end of the curtain.

A bracket 785 is supported upon the front face of the bellows frame 62 and supports an electric push button 786. Wires 787, 788 for electric current connected to a battery not shown are attached to the said button and connect with the said solenoids 768, 769. The push button 786 is in the path of a lug 790 extending from the sector 399.

To use the apparatus it will be first noted that the numbering machines having the housings 685, 686 are set with their counters at their zero positions when the lens of the camera photographs an object or picture its true and full size. Upon the camera frame being longitudinally moved in one direction, the counters on one of the numbering machines which I will designate as No. 1, will increase, while the counters on the other numbering machine remain stationary, and when the camera frame is moved in the opposite direction from the initial position, the counters on the second or No. 2 numbering machine will increase, while the counters on No. 1 remain stationary.

When a photograph is to be made which is either larger or smaller than the copy on the copying board 756, the camera must be longitudinally moved from its initial or zero position, so that the photograph to be produced on the sensitized material in the plate holder 92 will be the proper size.

To locate the camera the proper distance from the copying board with the proper focus, the operator uses the adjusting chart having the base 680, in case the picture is to be made greater or smaller than the copy on the copying board. After he has determined the proportionate increase or decrease in size of the picture to be produced, the operator locates the rider of the guide leg 684, over a number of one of the arcs indicated from one to 20, proportional to the size of the copy and in case of a reduction, the cross lines of the rider 684a are then located over a number which corresponds to the proportionate length required for said reduction, and in case of an enlargement the rider is located over one of said arcs corresponding to the proportional size of enlargement, and the cross lines of the rider are then brought over a number corresponding to the size of the copy. In other words suppose a copy thirteen inches in width is to be photographed to produce a picture eleven inches wide, the cross lines of the rider are brought over the number 11 on the arc marked thirteen. The operator then reads the number on the sector 682 over which the pointer 683 is located. The camera is then longitudinally moved from the copy board 756, so that the counters of the numbering machine having the housing 686 agree with the number on sector 682 under the pointer 683. If the picture is to be an enlargement of the copy on the copyingboard, and if the copy is eleven inches wide and it is to be enlarged to thirteen inches in width, the operator locates the rider on the arc No. thirteen and swings it until the rider is over number eleven on said arc. The operator reads the number indicated by the pointer 683 on the sector 682, and then moves the camera toward the copyboard, until the counters of the numbering machine having the housing 685 indicate the number on the sector.

By moving the camera frame having the side sills 38, 39, the rack 30 causes the spur gear 111 to rotate and with it rotation is given to the spur gear 113 through the bevel gear clutch members 112 and 115. The gear 113 rotates the gear 127 and thereby the gear 128 rotates the gear 132, which latter turns the gear 157. By means of the rotations of the gear 157 the shaft 156 is rotated and the spiral toothed cone 160 turns with said shaft. The bevel gear 164, meshing with said spiral toothed cone 160 causes the shaft 161 to rotate with a variable speed by reason of the longitudinal movement imparted to said bevel gear 164. The shaft 161 through the spur gears 163, 169 and 167 transmits rotation to the shaft 165. The latter causes the bevel gear 168 to turn, and a variable speed of rotation is transmitted to the spiral toothed cone 176. It will be noted that a uniformly variable speed is transmitted from the spiral toothed cone 160 to the spiral toothed cone 176. The shaft 175 rotates with the cone 176 and thereby the spiral gear 177 is turned. The spiral gear 177 turns the spiral gear 183, and thereby the spiral gear 184 is turned at the same time. The gear 184 turns the spiral gear 189 and with the latter rotation is given to the spiral gear 190. The gear 190 rotates the spiral gear 191, by virtue of which the screw 48 is rotated. With the rotations of the screw 48 the nut 65 causes the bellows frame 160 to receive its requisite longitudinal movement. By means of the train of gears between the gear 111 and the screw 48 the bellows frame is moved in or out with a variable speed.

The mechanism just described obtains the proper distances between the lens and sensitized plate in the plate holder, for varying distances between the copyboard and the lens, thereby obtaining a correct focus for an enlargement or reduction of the copy and which results from the equality of the number on the sector 682 under the pointer 683 and the number indicated by the counter.

Should the proper focus not be obtained by these direct mechanical connections by virtue of some latent imperfections, the operator retards the longitudinal movement of the bellows frame 60 by inserting the regulating plugs in the double rack 32. The bevel gear clutches 112, 116 are then disengaged for an interval of time depending upon the lengths of the regulating plugs, and thereby the movement of the back of the camera or bellows frame 60 is retarded, and a proper focus is obtained.

The bevel gear 196 rotating with the screw 48 turns the bevel gear 333, and thereby the shaft 332 is given rotation and with it the worm 334 turns. The worm wheel 320 is turned by the rotations of the worm 334. The gears 314, 315 and 316 are turned with the worm wheel 320. The gears 249, 272 and 292 receive rotation respectively from the gears 314, 315, and 316, and the plungers 252, 276 and 296, are brought in proper position to coact with the stop 245, and thereby the disk 235 is enabled to move the diaphragm at proper times to obtain the required exposures.

The diaphragm opening and the screen distance is of such size that the dots on the sensitized material will be of the proper shape and density. The gears operating the diaphragm are of such size that they will always keep the diaphragm opening of such size that the dots on the sensitized material will be of the proper density and size without shifting the screen.

The operator next partially turns the handle 57 which moves the spur gear 605, and motion is transmitted to the spur gear 612. The spur gear 612 pulls down the link having the members 670, 671, which imparts movement to the spur gear 657. The gear 657 rotates the pinion 655 and thereby the gear 654 is rotated. The gear 654 meshing with the teeth 239 of the disk 235 partially rotates it in the direction of the arrow A to open the opening of the diaphragm having the blades 215 against the tension of the spring 302.

During the movement of the gear 612 the cam 613 engages the rack 537 and raises the latter. The movement of said rack causes the rotation of the gear 562 and the spiral gear 563. The latter turns the spiral gear 328 and thereby the pawls 322, 323 and 324 are swung. The said pawls 322, 323 and 324 respectively move the annular ratchets 260, 280 and 300 carrying respectively the cams 265, 285 and 303. The said cams respectively raise the plungers 252, 276 and 296 when the stop 245 is in its lowered position and the diaphragm is in its opened position. The spur gear 612 transmits motion to the spur gear 616. With the movements of the gear 616 movement is given to the cam 618 which latter engages the lever 647. The lever 646 is swung by the lever 647 and the fingers 641, 642 and 643 with the shaft 640 are raised.

The fingers 641, 642 and 643 engaging the hubs 376, 426 and 476 force the bevel gears 375, 425 and 475 to mesh respectively with the bevel gears 340, 390 and 440. The said bevel gears are held in mesh by the plungers 357, 407 and 457. The plunger 457 actuates the connecting rod 732 and thereby the tubular shaft 727 is turned through ninety degrees, and closes the electric circuit between the main line wires 745, 746, the electric motor 591 and the lamp 743. With the movement of the spur gear 616 the bevel gear 617 through the bevel gear 629 imparts a partial rotation to the shaft 625 and fingers 626, 627 and 628. The said fingers respectively actuate the disks 358, 408 and 458 which cause the plungers 357, 407 and 457 to lock with the grooves 377, 427 and 477 of the hubs 376, 426 and 476.

Figure 1:
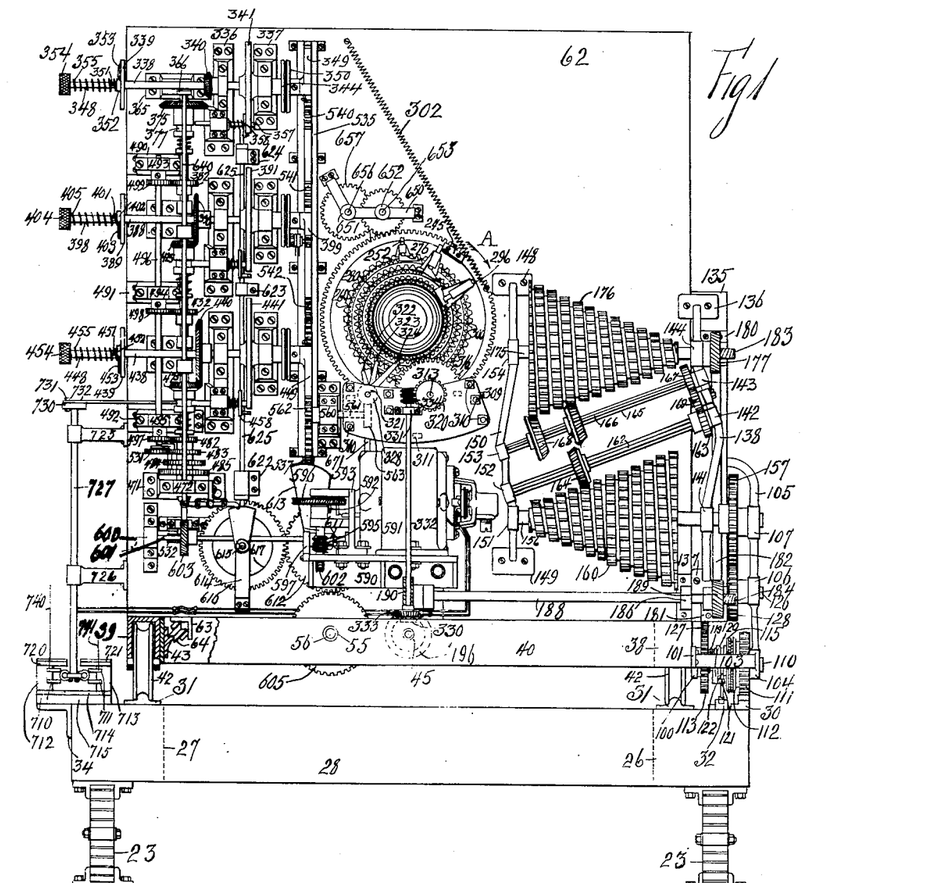
Figure 1 represents a front elevation of the automatic operating camera with a portion of its supporting frame and a fragmentary section of Fig. 3.
Figure 2:
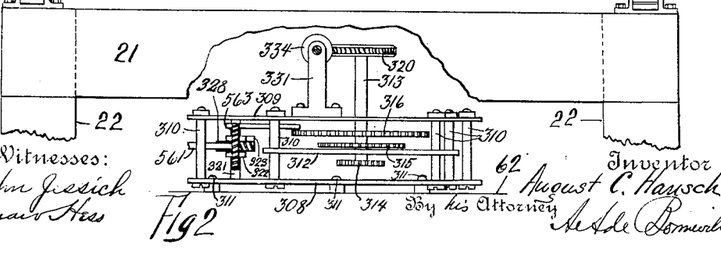
Fig. 2 shows an enlarged bottom view of some of the details of Fig. 1.
Figures 5, 6, 7, 8, 9, 10:
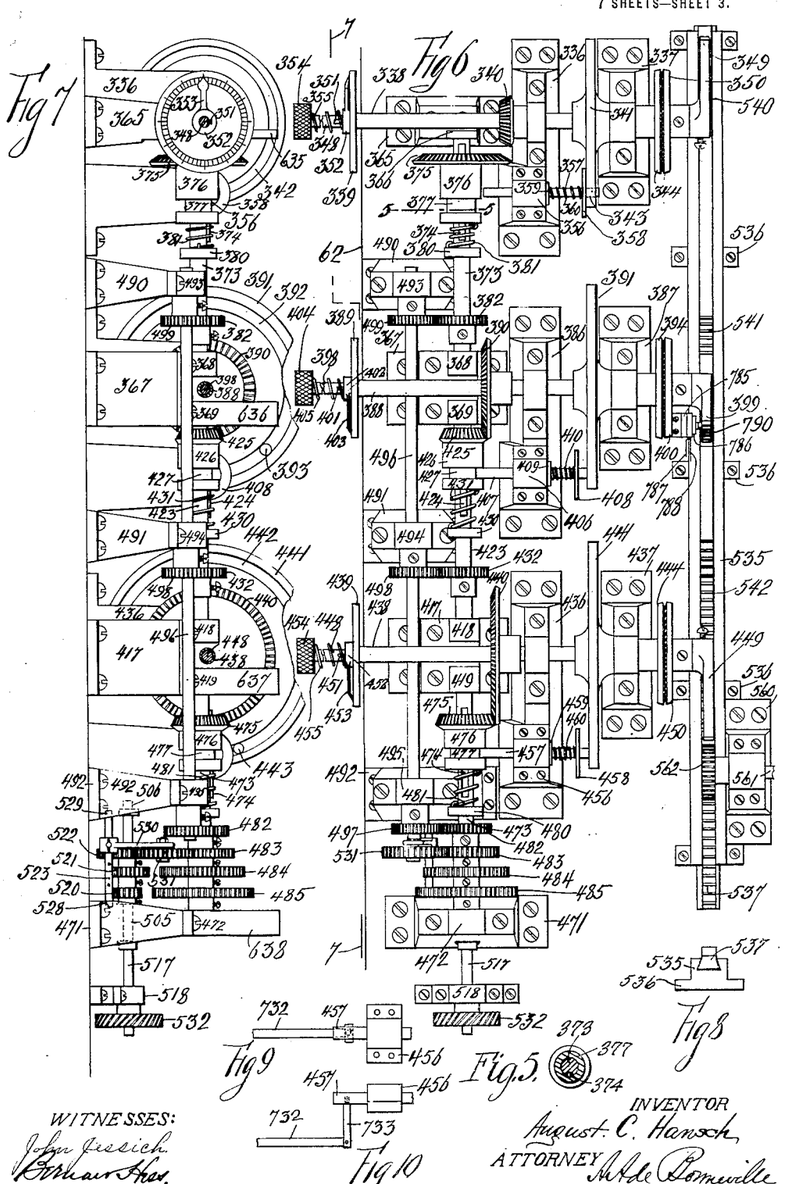
Fig. 6 represents an enlarged fragmentary portion of Fig. 1.
Fig. 7 shows a left hand side view of Fig. 6 with a section on the line 7, 7 of Fig. 6.
Fig. 8 is a bottom view of a pair of elements of Fig. 6.
Fig. 9 shows a fragmentary portion of Fig. 8.
Fig. 10 shows a bottom view of Fig. 9.
Figure 11:
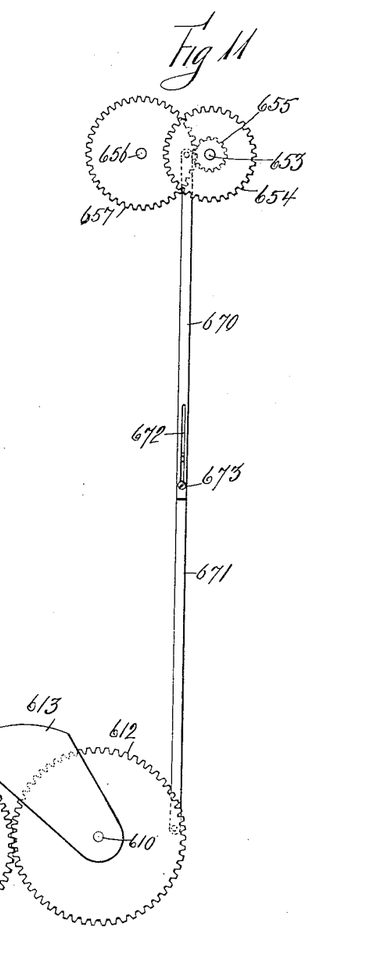
Fig. 11 shows an elevation of some of the details of Fig. 1.
Figures 12, 13:
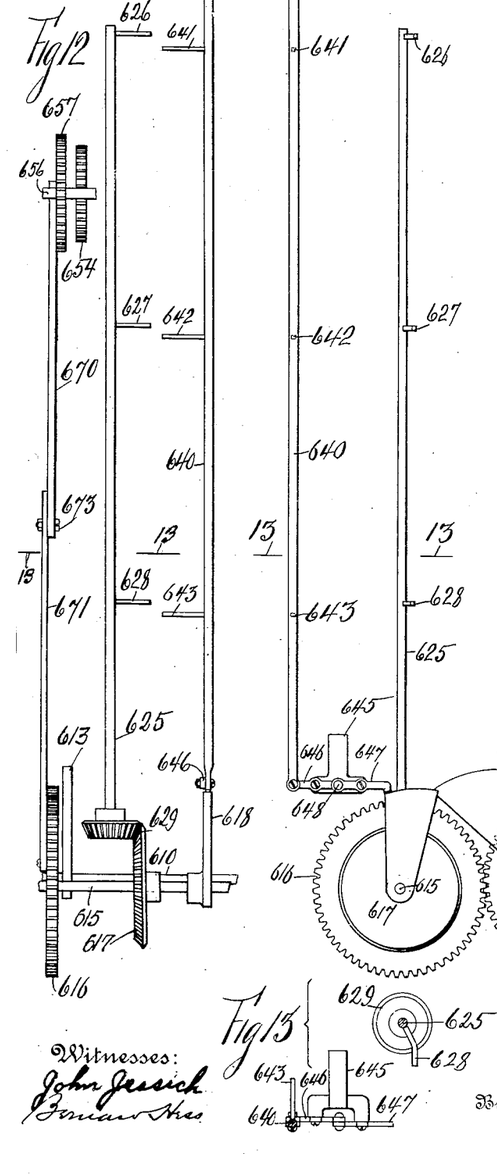
Fig. 12 represents a left hand side view of Fig. 11.
Fig. 13 shows a section of Fig. 12 on the line 13, 13.
Figure 14:
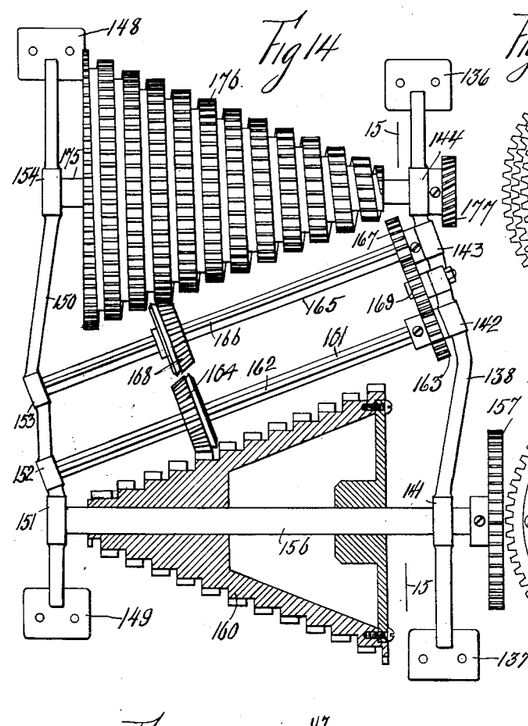
Fig. 14 represents a fragmentary portion of Fig. 1 and a partial vertical axial section thereof.
Figure 15:
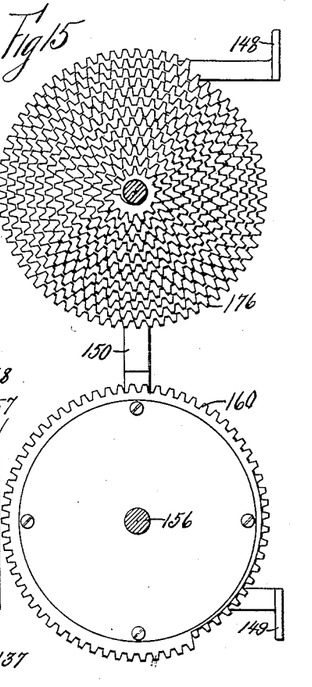
Fig. 15 shows a partial right hand side view and section of Fig. 14 on the line 15, 15, with some of the parts omitted.
Figures 16, 17, 18:
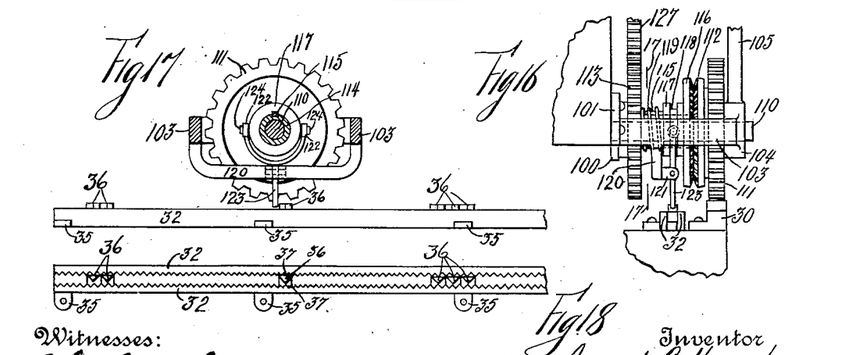
Fig. 16 is an enlarged fragmentary portion of Fig. 1.
Fig. 17 is a section of Fig. 16 on the line 17, 17.
Fig. 18 shows a partial top plan view of Fig. 17.
Figures 19, 20, 21, 22:
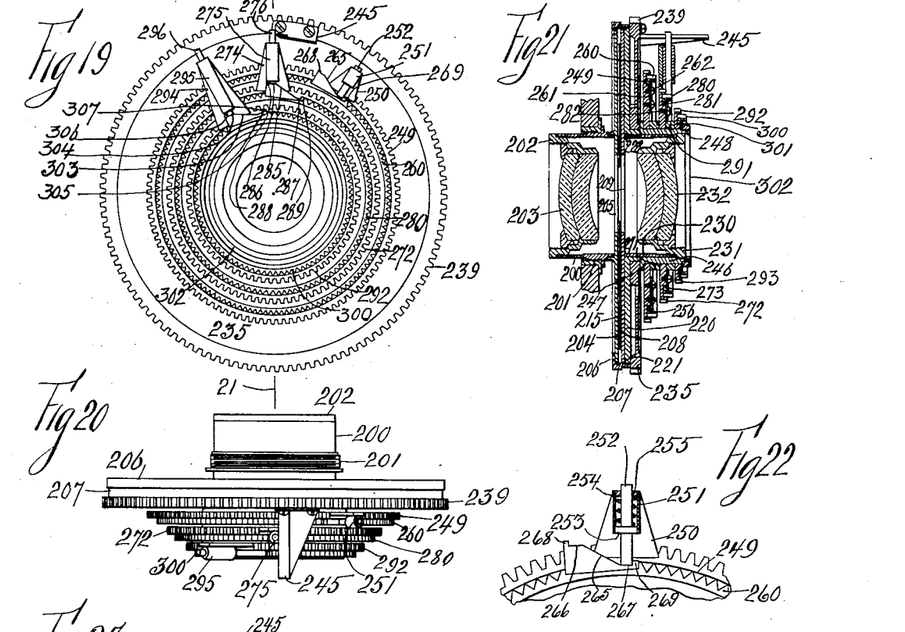
Fig. 19 represents an enlarged detail of Fig. 1.
Fig. 20 shows a top plan view of Fig. 19.
Fig. 21 is a section of Fig. 19 on the line 21, 21.
Fig. 22 represents an enlarged fragmentary portion of Fig. 19.
Figure 23:
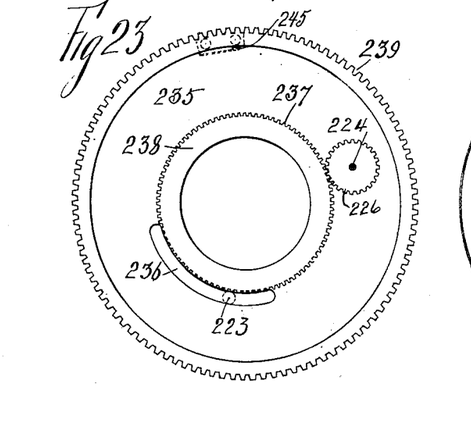
Fig. 23 is a rear view of a detail of Fig. 19.
Figure 24:
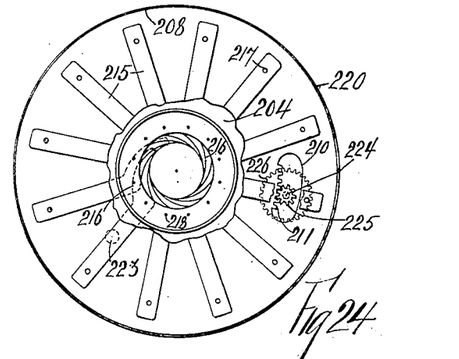
Fig. 24 shows a partial rear view of some of the details of Fig. 19.

By means of the rotations of the armature shaft of the motor the worm 592 receives rotation, which in turn rotates the worm wheel 596. The worm 595 turns the worm wheel 602 and the latter causes the rotation of the spiral gear 603. The spiral gear 603 turns the spiral gear 532 and with it the shaft 517. Variable speeds are transmitted from the shaft 517 to the shaft 473 by means of the interposed gearing. The pairs of gears 482, 497–498, 432–499, 382 transmit speeds respectively to the shafts 423, 373. Figs. 1 and 6 particularly show the positions of parts after the bevel gears 375 and 340 are disengaged. The bevel gear 375 rotates with the shaft 373 and when in mesh with the bevel gear 340 rotates the disk 341, and by means of the bevel gear clutch members 344 and 350 the sector 349 receives rotation, so that it can mesh with its accompanying teeth 540 of the rack 537 forcing it down. The rack 537 turns the spur gear 562 which transmits motion to the pawls 322, 323, 324 by means of the spiral gears 563 and 328. The pawl 324 when turning engages the annular ratchet 300 and in conjunction with the cam 303 releases the plunger 296 from the stop 245. After the plunger 296 is released, the spring 302 pulls the toothed disk 235, until the stop 245 strikes the plunger 276. With the turning of the disk 235 the teeth 237 thereof rotate the gear 226 and with it the pinion 225. The latter meshing with the teeth 211 of the disk 208, causes a closing movement of the blades 215 of the diaphragm. The gears between the motive power and gear 340 are preferably made of such size that the dial 339 and the sector 349 will make a complete revolution in one minute. In this way there can be obtained the changing opening, and any time from one second to one minute. The gears operating the dial 389 will make one revolution in 2 minutes and the gears operating the dial 439 are proportioned so that the dial makes one revolution in four minutes.

The disk 341 continues turning until the plunger 357 engages the opening 343 thereof. The plunger 357 is thereby released from the groove 377 and the gears 340 and 375 are moved out of mesh and thereby the elements on the sleeve 338 and shaft 348 are stopped turning. To properly locate the sector 349 with respect to the rack 537 so as to engage it at the proper time, the operator pushes in and turns the knurled head 354 and locates the pointer 353 on the dial 339 so that the sector 349 will be properly positioned with said rack.

The bevel gear 425 rotates with the shaft 423 and when in mesh with the bevel gear 390 rotates the disk 391 and by means of the bevel gear clutch members 394 and 400, the sector 399 receives rotation so that it can mesh with its accompanying teeth 541 of the rack 537 forcing it down. The rack 537 turns the spur gear 562 which transmits motion to the pawls 322, 323 and 324 by means of the spiral gears 563 and 328. The pawl 323 when turning engages the annular ratchet 280 and in conjunction with the cam 285 releases the plunger 276 from the stop 245. After the plunger 276 is released, the spring 302 pulls the toothed disk 235 until the stop 245 strikes the plunger 252. With the turning of the disk 235, the teeth 237 thereof rotates the gear 226, and with it the pinion 225. The latter meshing with the teeth 211 of the disk 208 causes a further closing movement of the blades 215 of the diaphragm. The lug 790 on the sector 399 after its engagement with the rack 537 engages the electric button 786 to release the catches 770, 771 of the core of the solenoids 768, 769, to drop the curtain 780 of white material, by means of which the shadow exposure in a half tone is strengthened. After the curtain has been lowered in place in front of the copy on the copyboard the sector 399 continues turning with the disk 391, until the plunger 407 engages the opening 393 thereof. The plunger 407 is thereby released from the groove 427 and the gears 390 and 425 are moved out of mesh, and thereby the elements on the sleeve 388 and shaft 398 are stopped turning. To properly locate the sector 389 with respect to the rack 537, so as to engage it at the proper time, the operator pushes in and turns the knurled head 404 and locates the pointer 403 on the dial 389, so that the sector 399 will be properly positioned with said rack.

The bevel gear 475 rotates with the shaft 473 and when in mesh with the bevel gear 440 rotates the disk 441 and by means of the bevel gear clutch members 444 and 450, the sector 449 receives rotation, so that it can mesh with its accompanying teeth 542 of the rack 537. The said rack turns the spur gear 562 which transmits motion to the pawls 322, 323 and 324 by means of the spiral gears 563 and 328. The pawl 322 when turning engages the annular ratchet 260 and in conjunction with the cam 265 releases the plunger 252 from the stop 245. After the plunger 252 is released, the spring 302 pulls the toothed disk 235 until the diaphragm having the blades 215 is closed. With the turning of the disk 235 the teeth 237 thereof rotates the gear 226 and with it the pinion 225. The latter meshing with the teeth 211 of the disk 208 causes the closing of the diaphragm having the blades 215. The disk 441 continues turning until the plunger 457 engages the opening 443 thereof. The plunger 457 is thereby released from the groove 477 and the gears 440 and 475 are moved out of mesh and thereby the elements on the sleeve 438 and the shaft 448 are stopped turning. The sector 349 engages the rack teeth 540. The sector 399 is so angularly positioned relative to sector 349 that it engages the rack teeth 541 as soon as the sector 349 is disengaged from the rack teeth 540. To properly locate the sector 449 with respect to the rack 537 to as to engage it at the proper time, the operator pushes in and turns the knurled head 454 and locates the pointer 453 on the dial 439 so that the sector 449 will be properly positioned with the said rack 537.

With the release of the said plunger 457 the arm 732 turns the tubular shaft 727 which disconnects the contact pieces 735 from the contact bars 710, 711, thereby opening the electric circuit between the motor 591, the light and the main line wires 745, 746 of the source of electric current.

By turning the handle 57 one half of a revolution, the rack 537 will be raised, so that the group of teeth 540 can engage the sector 349. Thereby all the elements between the spur gear 562 and the blades 215 are operated three times. By turning the handle 57 one third of a revolution, the rack 537 will be raised so that the group of teeth 541 will be positioned to be engaged by the sector 399. Thereby all elements between spur gear 562 and the blades 215 are twice operated. The latter results because the spur gear 562 moves only two-thirds of a revolution. By reason of this the annular ratchet 300 is not engaged by the pawl 324. The annular spur gear 300 not turning, holds the cam 303, and prevents the rising of the plunger 296, and consequently the spring moves the disk 235 until the stop 245 engages the plunger 276.

By turning the handle 57 one sixth of a revolution, the amount of rotation of handle 57 is determined by a decided stop being felt when the gears 340, 375, etc., mesh and in each instance the rack 537 will be raised, so that the group of teeth 542 will be positioned to be engaged by the sector 449, thereby the elements between the spur gear 562 and the blades 215 are operated once. The reason for the latter being that the spur gear 562 turns only one-third of a revolution. This results in not moving the annular ratchet 300 by means of the pawl 324 and the annular ratchet 280 not engaging the pawl 323. The annular ratchet 300 and 280 not turning prevent the cams 303, 285 respectively from raising the plungers 296 and 276. Consequently the spring 302 moves the disk 235 until the stop 245 engages the plunger 252. The handle 57 is returned to its normal position after it has been turned.

The coaction of the motor 591, the pairs of gears 520, 485—521, 484—522, 483, the sectors 349, 399, 448 with the rack 537, constitute a timing apparatus for the blades 215 of the diaphragm.

The diaphragm is opened by the handle 57 so that at least the stop 245 passes one of the plungers. After the handle is released the spring 302 tends to close the diaphragm and the openings depend upon the location of the plungers 252, 276 and 296. The locations of the latter depend upon the location of the camera frame. The location of the camera frame depends upon the enlargement or reduction required. The amount of the turning of the handle 57 regulates the number of plungers that are to be brought into action and this depends upon the nature of the work.

The screen 73 is adjusted or moved different distances from the plate holder 92, to obtain different sizes of half tone dots in the negative located in said plate holder. This is necessary with the varied colored copies. In a very black copy the screen is moved close to the sensitized material in the plate holder 92, so that the light passing through the lens and the screen is diffracted a small amount. The exposure is then lengthened and there is obtained a negative, which is not like the copy (all black) but lighter.

In a copy that is very light, the screen 73 is moved a greater distance from the sensitized plate in the plate holder 92 and the light rays are then diffracted a larger amount. The exposure is then decreased and a negative is produced which is not like the copy (very light) but which has a fair proportion of black and white.

By means of the chart with the base 180 the operator determines the requisite reduction or enlargement desired and moves the camera frame having side sills 36 and 39, by means of the regulating handle 57, to a position so that the numerals on the counters in the housing 683 agree with the number determined by the chart. By means of the appurtenances of the invention described the lamps 743 are lit. A further movement of the handle 57 drops the curtain 780 in operative position. The appurtenances of the diaphragm with blades 215 having been set, the blades 215 operate and an exposure is made. The elements interposed between the handle 57 and the blades 215 time the exposure for the required duration.

Having thus described my invention what I desire to secure by Letters Patent and claim is:

1. In an apparatus of the character described the combination of a runway frame, a camera frame movably supported thereon, a camera supported on the latter frame, a stationary bellows frame and a plurality of movable bellows frames for the camera, a lens in the stationary bellows frame and means to move a sensitive material in one of the movable bellows frames and means to automatically focus the apparatus by the movement of said camera frame.

2. In an apparatus of the character described the combination of a movable camera frame, a camera on the frame, a stationary bellows frame on the camera frame, a plurality of movable bellows frames on the camera frame, a lens in the stationary bellows frame and means actuated by the movements of the said camera frame to carry the sensitized material in one of the movable bellows frames predetermined amounts in relation to the movements of the camera frames, to always maintain a proper focus with the camera, for different locations of the camera frame.

3. In an apparatus of the character described the combination of a movable camera frame, a camera on the frame, a lens for the camera, a movable bellows frame for the camera, means to carry a sensitized material in the movable bellows frame, means actuated by the movements of the said camera frame to automatically move said bellows frame with any movements of the camera frame and means to vary the movement of the bellows frame to maintain a correct focus with the camera.

4. In an apparatus of the character described the combination of a movable camera frame, a camera for the frame, an adjustable diaphragm for the lens of the camera, means on the camera frame to locate the diaphragm to an open position, movable stop plungers adjacent to the lens, means operated by the movements of the camera frame to locate said stop plungers in predetermined positions relative to the positions of the camera frame, said stop plungers controlling the movements of the diaphragm during its closing movements, and a stop coacting with said plungers to limit said closing movements.

5. In an apparatus of the character described the combination of a camera frame, a camera on the frame, a lens for the camera, a diaphragm for the lens, blades for the diaphragm, a toothed movable disk connected to the blades of the diaphragm, a stop on said disk, a shaft journaled in the camera frame, means to turn the shaft, means between the said shaft and toothed movable disk to turn the latter to open the blades of the diaphragm, a rack slidably supported on the front of the camera, means between said shaft and rack to raise the latter, annular movable ratchets concentric with the lens, means between said rack and the annular movable ratchets to turn the latter one after another, a cam on each annular ratchet, movable gears concentric with the lens, a spring actuated plunger carried upon each of the latter gear coacting with the stop on the disk each plunger coacting with one of said cams to raise said plungers with the ratchets that support the cams turning in one direction and to lower them when said direction is reversed and automatic means to actuate the gears carrying the plunger and means to close the diaphragm.

6. In an apparatus of the character described the combination of a runway frame, a camera frame movably supported thereon, a camera supported on the latter frame, a stationary bellows frame and a plurality of movable bellows frames for the camera, a lens for the camera, a diaphragm for the lens, a movable disk coacting with the diaphragm to open the latter, a stop on the movable disk, gears concentric with the lens, a plunger carried on each of said gears in the path of said stop, connections between said gears and the movable bellows frame to locate the plungers at predetermined locations, means to move said plungers one after the other out of the path of the said stop on the movable disk, and thereby permit said movable disk to turn and close the diaphragm.

7. In an apparatus of the character described the combination of a runway frame, a camera frame movably supported thereon, a camera supported on the latter frame, a stationary bellows frame and a plurality of movable bellows frames for the said frame, a movable and a stationary bellows frame for the camera, a lens for the camera, a diaphragm for the lens, a movable disk coacting with said diaphragm, means to move the said disk to open the diaphragm, a spring connected with the disk to close the diaphragm, a stop on said movable disk, gears concentric with the lens, plungers supported on said gears and in the path of said stop, means between the said gears and the movable bellows frame to locate the plungers of the said gears, the said stop coacting with said plungers causing the diaphragm to register the proper opening in relation to the position of the said movable bellows frame and automatic means coacting with the plungers to release them one after another at predetermined intervals.

8. In an apparatus of the character described the combination of a camera, a lens for the front of the camera, a diaphragm comprising blades for the lens, a movable disk coacting with said blades, a stop on the movable disk gears concentric with the lens, a plunger carried on each of said gears and in the path of said stop annular ratchets concentric with the lens, means on said ratchets to raise the plungers, a movable rack supported on the front of the camera, means on the front of the camera to intermittently move the rack at predetermined intervals of time, connections between the rack and said annular ratchets to move the latter, the cams on the annular ratchets during their movements raising said plungers at intervals out of the path of said stop to enable said movable disk to turn and close the diaphragm after a sufficient exposure has been obtained.

9. In an apparatus of the character described the combination of a camera, a lens for the camera, a diaphragm for the lens, and having movable blades, a movable disk coacting with said blades, a stop on the movable disk, gears concentric with the lens, a plunger carried on each of said gears and in the path of said stop, annular ratchets concentric with the lens, means on said ratchets to raise the plungers, a movable rack supported on the front of the camera, means between the rack and said ratchets to move the latter to release said plunger from said stop, shafts journaled over the front of the camera, a sector fastened to each shaft positioned to engage said rack, means to consecutively engage at predetermined intervals of time each sector with said rack, to lower said rack at predetermined intervals of time to move the said plungers out of the path of said stops and thereby permitting the said blades to operate.

10. In an apparatus of the character described the combination of a camera, a lens for the camera, a diaphragm for the lens, means normally tending to close the diaphragm, a movable rack for the camera, connections between the rack and said diaphragm, the movements of said rack controlling the movements of the diaphragm, a plurality of shafts, a sector fastened to each shaft for said rack, means to locate the sectors in relatively different positions with said rack, a sleeve on each shaft, means to connect each sleeve with its accompanying shaft, a bevel gear on each sleeve a second shaft for each of the other shafts, means to rotate the second shafts, a bevel gear with a hub having a groove formed therein slidably supported on the second shafts, and located to mesh with the bevel gear on its accompanying sleeve, means to disengage said bevel gears, a disk having an annular groove and opening fastened to each sleeve, a spring actuated plunger supported in the paths of the grooves of said disks and the grooves of said hubs, to permit the disengagement of said bevel gears when said plunger registers with the openings of the grooves of said disks, thereby stopping the rotations of said sleeves and with it said sectors and means to open the diaphragm.

11. In an apparatus of the character described the combination of a camera, a lens for the camera, a diaphragm for the lens, means normally tending to close the diaphragm, a movable rack for the camera, connections between said rack and diaphragm, the movements of said rack controlling the movements of said diaphragm, a motor, a first shaft geared with the armature shaft of the motor, an intermediate shaft geared with said first shaft, a third shaft, means to vary the speed between the third shaft and intermediate shaft, a fourth shaft rotated by the revolutions of the third shaft, a fifth and a sixth shaft axially in line with the third shaft, a bevel gear having a hub with a groove slidably supported on the third shaft, a bevel gear having a hub with a groove slidably supported on the fifth shaft, gears connecting the fourth and fifth shafts, a bevel gear having a hub with a groove slidably supported on the sixth shaft, gears connecting the fourth and sixth shafts, a manually operated shaft, a gear on the latter shaft, a second gear meshing with said gear, a shaft for the second gear, a link with one end pinned to the second gear, the other end of the link coacting with said movable disk, a cam fastened to the shaft of the second gear coacting with the rack to raise the latter, a third gear meshing with the second gear, a shaft for the third gear, a second cam fastened to the shaft of the third gear, auxiliary bearings, a shaft guided in said auxiliary bearings, fingers extending from the latter shaft located to engage the outside faces of the hubs of said bevel gears, the latter shaft actuated by the second cam, a second shaft with fingers oscillated by virtue of the movements of the said third gear, spring actuated plungers coacting with the groove of the hub of each bevel gear, the fingers of the second shaft coacting with said plungers, a second bevel gear meshing with each of said enumerated bevel gears, sectors coacting with the latter bevel gears, said sectors meshing with said rack and means to open the diaphragm.

12. In an apparatus of the character described the combination of a lens, a diaphragm having blades for the lens, means to position said blades, and means to move said blades to other positions at predetermined intervals.

13. In an apparatus of the character described the combination of a camera, a movable bellows frame for the camera, a lens for the camera, a spiral toothed cone journaled on the camera, means to turn the said cone, and connections between said cone and the movable bellows frame to obtain the proper focus between the lens of the camera and the movable bellows frame with respect to the distance between the lens of the camera and a copy to be photographed.

14. In an apparatus of the character described the combination of a camera, a lens for the camera, a diaphragm comprising blades for the lens, means to locate the blades to various predetermined openings, and other means to move the blades to obtain various openings through the diaphragm during an exposure.

Signed at the borough of Manhattan in the county of New York and State of New York this 28th day of March A. D. 1914.

AUGUST C. HANSCH.

Witnesses:
A. ADE BONNEVILLE,
JOHN JESSICH.